May 14, 1935. F. E. HAUGHEY 2,001,679
INSPECTION TAG FOR FIRE EXTINGUISHERS
Filed May 28, 1934
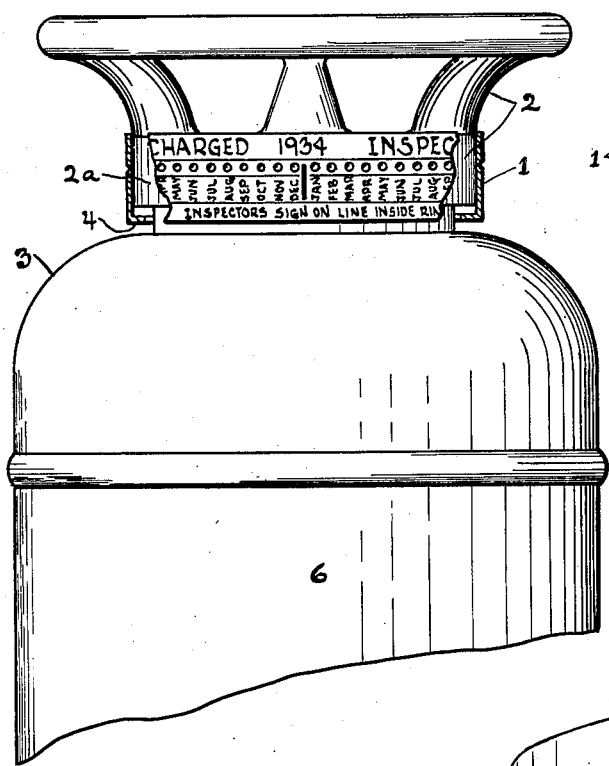
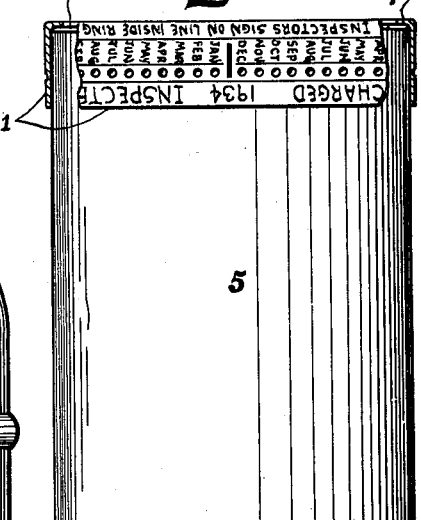
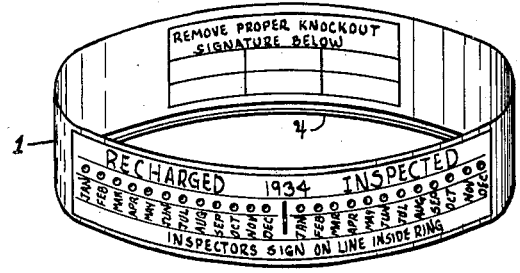
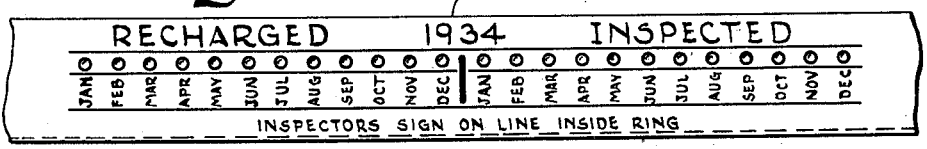
INVENTOR.
Frank E. Haughey
BY
ATTORNEY Patented May 14, 1935

2,001,679

UNITED STATES PATENT OFFICE 2,001,679

INSPECTION TAG FOR FIRE EXTINGUISHERS

Frank E. Haughey, Philadelphia, Pa., assignor to said Frank E. Haughey and Martha A. Haughey, his wife, as tenants by the entireties, both of Philadelphia, Pa.

Application May 28, 1934, Serial No. 727,999

7 Claims. (Cl. 40—21)

The present invention, which is a continuation in part of my application Serial No. 688,457, filed September 7, 1933, relates to the art of fire extinguishers, particularly of the portable type, and more particularly to improved means of making and retaining records of inspections of the same. "Inspections" is here used in its ordinary and generic sense to include records both of recharging and of subsequent inspections. Foam extinguishers and "soda and acid" extinguishers are illustrative of the broad class of extinguishers, particularly portable extinguishers, on which it is contemplated to employ my recording means, hereinafter also referred to, for example, as an inspection recording collar or a recording tag.

Regulations of the National Board of Fire Underwriters require frequent inspections of extinguisher units and recording of such inspections. Each extinguisher must be recharged at least once a year and must be subsequently inspected at least once every six months to make sure that the extinguisher is in operable condition. More frequent inspections between rechargings are preferred. In performing the inspection, the cap should be screwed off of the extinguisher so that an internal inspection of the charge and passages can be made. For the inspection requirement to be most effectual practically, it is highly desirable if not imperative, to be able to know with certainty that the cap was removed before a record of inspection was made. It is a primary object of this invention to provide a recording means which is adapted to be so associated with the extinguisher that it will be impossible for the inspector to record an inspection without actually removing the cap.

Heretofore it has been customary to employ paper or linen tags, tied to a handle of the extinguisher with a string or wire, as a means on which to keep a record of the date of recharging and subsequent inspections. Records so kept were easily obliterated, as often happened, and, moreover, invited being tampered with by capricious children or irresponsible employees. Also in moving the extinguisher around, such tags became badly soiled and sometimes torn or lost. This perishable nature of the record, and the lack of concern which it tended to induce in those charged with the duty of inspection, are important factors, largely responsible for the carelessness with which such job has been conducted.

Consequently, any means for recording inspections which will provide a lasting, imperishable record which may be easily read and conveniently made, and particularly which will insure that actual inspection has been made as above described, will be a great aid in the practical enforcement of the provisions of the National Board of Fire Underwriters and an aid to the company that wrote the insurance and to the city authorities in minimizing fires. Also such means will instill punctuality and obedience in the insured in making inspections and will promote a greater respect and concern for the important job of keeping "first aid fire appliances", e. g. portable extinguishers of the type mentioned, in proper condition. To answer these needs is among the objects of my invention. These and other objects and improvements will be apparent from the following description and illustrations.

I have found that an annular ring of stiff material, for example a metal ring, is particularly suitable as a recording device. Such ring, or inspection recording collar, is preferably of such diameter and width that, on the extinguisher on which it is to be employed, it will conveniently fit therearound between the dome and cap thereof, so that the ring can not be removed nor inspections recorded without first removing the cap from the mouth portion which receives it.

In a preferred adaptation of my invention, the ring, or recording collar, is of appropriate design so that it may be first employed as a sealing ring on a package of extinguisher charge. In recharging the extinguisher, the cap is removed, the old recording collar is removed, the fresh charge is placed in the extinguisher, the ring from the new package of charge is placed between the dome and cap of the extinguisher, and the cap is then screwed onto the dome. The recording collar is of such design that, on the particular extinguisher on which it is employed, it will be impossible to record an inspection without first removing the cap from the extinguisher.

For a quick understanding of an illustrative embodiment of my invention, reference is had to the accompanying drawing in which:

Figure 1 is an elevational view of the upper end portion of a typical, portable fire extinguisher equipped with my recording collar, which latter is partially broken away for the sake of clarity;

Figure 2 shows a package of extinguisher charge, having as a sealing ring my recording collar which here also is shown broken away;

Figure 3 is a broken section of the recording collar developed;

Figure 4 shows the recording collar or ring in perspective, showing the signature receiving area on the inner surface thereof.

Referring more in detail to the drawing in the several figures of which like numerals denote similar parts, 1 is my ring or recording collar placed between cap 2 and dome 3 of the extinguisher unit 6. The collar 1 has a flange or turned-in portion 4 which limits the axial movement of the ring upwardly by contact with the lower edge of hub 2a of the cap 2. The ring 1, or at least its upper portion snugly fits around hub 2a. In case the cap is not of such shape and design as itself to prevent moving the ring up and recording an inspection without actually having made one, the flanged portion 4 serves a necessary function in limiting the axial movement of the ring or collar upwardly.

The collar is provided with markings, as shown. It is dated with the year of recharging, the year in which it is placed on the extinguisher. This is true whether or not it is first employed as a sealing ring on a package of extinguisher charge. In the embodiment shown, the ring is dual-calendared and there is a series of weakened areas or knock-out holes, one adjacent each month, constituting a set of inchoate date marks. The months and other writing are preferably supplied with raised letters, and different colors for the markings and knock-out holes may be employed, if desired, to make the record more apparent at a glance. For example, the weakened areas may be colored red and the months and other letters may be in blue, all on a metallic back-ground. The month of recharging is recorded on the left-hand calendar, and the month or months of subsequent inspection on the right-hand calendar.

By way of illustration, suppose that October is punched in the left-hand or "recharged" calendar and April is punched in the right-hand or "inspected" calendar, 1934 being the year stamped on the collar. It is obvious that the extinguisher was recharged first and inspected later. Hence the date of recharging would be October 1934 and the date of the subsequent inspection would be the following April, i. e. April 1935.

The signature receiving area shown on the inside surface of the ring in Figure 4 may be provided by coating such surface with some material, for example a metal paint, so that it will readily take a signature. The areas where the signatures are to be made are preferably adjacent the flange 4 of the ring, to add to the security that no signature can be made or inspection indicated without first removing the extinguisher cap.

Where the recording collar is initially employed as a sealing ring on a package of extinguisher charge, as shown in Figure 2 of the drawing, the flange 4 serves to anchor the cardboard disc 7 tightly against the top of the container 5. When the top is removed from the package, the disc 7 is pushed out of the ring 1 and the latter is then ready to be placed on the extinguisher as soon as the recharging thereof has been completed.

From the foregoing description as a whole it can be seen that in the preferred embodiment of my invention there are two important guarantees against fraudulent recording of inspections where no inspection has in reality been made: (1) The collar fits so snugly around the hub of the cap 2 that no weakened area or knock-out hole can be punched out without first removing the cap from the extinguisher, and (2) the inspector cannot place his required signature on the inside surface of the collar without first removing the cap from the extinguisher. Any recording means which will provide either one or the other or both of these guarantees against fraud or dereliction in duty by the inspector is contemplated within the scope of the appended claims. Likewise various other modifications of the invention as illustrated is comprehended within the scope of claims. For example the indicia on the collar may be arranged in any other convenient system. There might be only a single set of months of the year and two rows of weakened areas or knock-out holes, one on which to indicate time of recharging and the other to record subsequent inspections. Again, though less desirable, in place of providing a signature receiving area on the inside wall of the collar, a set of knock-out holes, with numbers adjacent them, separate from those provided for recording inspections, might be used to identify the inspector by number. Also, in the case of certain designs of fire extinguishers the flange is not an indispensable part of the recording collar if, without it, it will still be impossible to indicate an inspection without first removing the cap from the extinguisher.

These and many other modifications may readily occur to those familiar with this art. All of them are contemplated by this invention and come within the scope of the appended claims. I do not confine myself to recording means in the form of an annular ring but contemplate any recording means which assures that before an inspection is recorded or a signature made, both or either, the cap has been removed.

While a metal collar is described, it is of course understood that I do not limit myself as to the material out of which my recording means may be made. It may be made out of any other stiff material of sufficient strength and durability. For example, though less desirable than metal, cardboard or stiff paper collars are contemplated.

Also, while it is a preferred aspect of my invention to employ my recording collar initially as a sealing ring on a package of extinguisher charge and then as a recording collar on an extinguisher for which it is made of a suitable size to fit, I also contemplate the separate use of such a ring as a recording collar without its having first been employed as a sealing ring on a package of charge for such extinguisher.

What I claim is:

1. In combination, a fire extinguisher having a main body portion, a mouth portion therein and a cap removably enclosing said mouth portion and a recording tag attached to said extinguisher between the cap and main portion thereof, said tag bearing a set of inchoate date marks and being so attached to said extinguisher as to require removal of the cap as a prerequisite to the completion of an inspection indication on said recording tag.

2. In combination, a fire extinguisher having a main body portion, a mouth portion therein, and a cap removably enclosing said mouth portion and an annular ring of stiff material, having a clearly defined signature receiving area on the inside wall thereof, being placed around said extinguisher between the cap and main portion thereof so as to require removal of the cap as a prerequisite to removal of the ring, and removal of the ring as a prerequisite to making a record on said signature receiving area.

3. In combination, a fire extinguisher having a main body portion, a mouth portion therein and a cap removably enclosing said mouth portion and an annular ring of stiff material bearing a set of inchoate date marks, being placed around said extinguisher between the cap and main portion thereof, the said ring being of such size and design and having the inchoate date marks so located thereon as to require removal of the cap as a prerequisite to the completion of an inspection indication on said ring.

4. In combination, a fire extinguisher having a main body portion, a mouth portion therein and a cap, having a hub adjacent the mouth of the extinguisher, removably enclosing said mouth portion and an annular ring of stiff material, bearing a set of inchoate date marks, being placed around said extinguisher between the cap and main portion thereof, said ring being of such diameter as to snugly fit around the hub of said cap and having means cooperating with said cap to limit the axial movement of the ring upwardly and the ring being of such depth and having the inchoate date marks located sufficiently toward the top thereof as to require removal of the cap as a prerequisite to the completion of an inspection indication on said ring.

5. In combination, a fire extinguisher having a main body portion, a mouth portion therein and a cap, having a hub adjacent the mouth of the extinguisher, removably enclosing said mouth portion and an annular ring of stiff material, bearing a set of inchoate date marks, being placed around said extinguisher between the cap and main portion thereof, said ring being of such diameter and depth that at least the upper portion thereof encircles the hub of said cap, having said inchoate date marks located in the said upper portion thereof, having a signature-receiving area on the inside wall thereof, and having a turned-in flange on the lower edge thereof, the diameter of said ring being not substantially greater than the diameter of the said hub of said cap, thereby requiring removal of the cap as a prerequisite to the completion of an inspection indication on said ring.

6. In combination, a fire extinguisher having a main body portion, a mouth portion therein and a cap, having a hub adjacent the mouth of the extinguisher, removably enclosing said mouth portion and an annular ring of stiff material placed around said extinguisher between the cap and main portion thereof, said ring being of diameter not substantially greater than that of said hub, being of such depth that at least the upper portion thereof encircles said hub, and having a clearly defined signature receiving area on the inside wall of the hub encircling portion of said ring.

7. An inspection recording collar for fire extinguishers comprising an annular ring of stiff material adapted to fit around the extinguisher between the cap and main body portion thereof, said ring having a series of weakened areas adapted to be punched out and a corresponding series of indicia adjacent said areas, whereby each inspection is recorded, and a flange extending inwardly adjacent the lower edge of said ring.

FRANK E. HAUGHEY.